United States Patent [19]
Ueno

[11] Patent Number: 5,253,115
[45] Date of Patent: Oct. 12, 1993

[54] REARVIEW MIRROR WITH AN OPERATING CONDITION DISPLAY

[76] Inventor: Yasushi Ueno, 2-34-2, Hino, Kohnan-Ku, Yokohama, Japan

[21] Appl. No.: 690,464

[22] Filed: Apr. 24, 1991

[30] Foreign Application Priority Data

Feb. 21, 1991 [JP] Japan .................... 3-15115

[51] Int. Cl.⁵ ............... G02B 7/18; G60R 1/04; G60R 1/12; B60Q 1/26
[52] U.S. Cl. .................... 359/838; 359/871; 359/872; 340/944; 340/464; 340/465; 340/466; 340/475; 340/479; 362/83.1; 362/140; 248/480; 248/481
[58] Field of Search ......... 350/600, 601; 340/464, 340/465, 466, 469, 475, 479, 441, 468, 485, 944, 467, 478, 815.01, 815.02, 815.03, 815.06, 815.07, 815.15; 362/83.1, 140; 359/838, 871, 872

[56] References Cited

U.S. PATENT DOCUMENTS 2,182,275 12/1939 Blonkvist .
3,665,392 5/1972 Annas .................... 362/83.1
4,588,267 5/1986 Pastore ................... 350/600
4,970,493 11/1990 Yim ........................ 340/464
5,016,996 5/1991 Ueno ....................... 359/838

FOREIGN PATENT DOCUMENTS 62-177549 11/1987 Japan .
0751783 7/1956 United Kingdom ......... 248/472

Primary Examiner—Bruce Y. Arnold
Assistant Examiner—R. D. Shafer
Attorney, Agent, or Firm—Schwartz & Weinrieb

[57] ABSTRACT

A rearview mirror with an operating condition display to be positioned in front of a driver's seat within the passenger cabin of a vehicle is composed of an operating display provided with an operating condition display portion visible through the windshield by illumination of preselected portions thereof and a rearview mirror which is capable of being adjusted to a predetermined angle of use with respect to the operating condition display construction.

28 Claims, 5 Drawing Sheets

REARVIEW MIRROR WITH AN OPERATING CONDITION DISPLAY

FIELD OF THE INVENTION

This invention relates to the technology of a rearview mirror with an operating condition display and its installation technique, and especially relates to a rearview mirror with an operating condition display which does not affect the position of the rearview mirror.

DESCRIPTION OF THE PRIOR ART

Heretofore, as an example of a structure for informing a pedestrian or an opposing vehicle of the speed of a travelling automobile, there has been provided a structure in which a plurality of lights are mounted upon the front surface of a hood of a truck, and for example, one light is individually illuminated upon the vehicle as the vehicle experiences increasing increments in speed of each 20 km/h, but equipment of this kind is not provided upon other vehicles including automobiles, and also this kind of display equipment spoils the appearance of a passenger car and the like.

Accordingly, the applicant of this invention has previously invented a device equipped with an operating condition display panel displaying the operating speed of the vehicle, turn direction and brake condition of an automobile according to the vehicle's driving condition, upon the rear surface of the rearview mirror and at a position disposed in front of the driver's seat and which is visible from the front of the vehicle. (U.S. Ser. No. 431,069).

However, according to the above mentioned construction, an operating condition display being integrated with the rear surface of the housing of the rearview mirror tends to incline when the rearview mirror is adjusted according to the driver's position, especially, from the opposing vehicle, whereby the visibility of the operating condition display panel becomes extremely unacceptable.

OBJECTS OF THE INVENTION

This invention has been made in view of the foregoing problems, and objects of this invention are;

(1) to provide an operating condition display panel mounted upon the rear surface of the rearview mirror in front of the driver's seat which is visible through the windshield of the vehicle, and (2) to construct a rearview mirror with an operating condition display whose installed position is not affected by means of the adjustment of the angle of the rearview mirror.

Moreover, the principal object of this invention is to construct a rearview mirror from which an operating condition display device is relatively, readily, and easily removable.

SUMMARY OF THE INVENTION

The rearview mirror with an operating condition display of this invention to be positioned inside front of a driver's seat in the personnel area of an automobile also comprises an operating condition display device indicating the automobile's operating condition by illuminating different displays which are capable of being seen through the windshield.

The rearview mirror with the operating condition display of this invention to be positioned in front of a driver's seat is not only intended to install an operating display device constructed with an operating condition display panel which displays an operating condition of an automobile by illuminating a particular display which is recognizable through the windshield, but is also intended to make the rearview mirror freely adjustable with respect to the operating condition display device through means of a universal joint connection.

Still further, an object of this invention is not only to install a rearview mirror in front of a driver's seat of an automobile which is visible through the windshield, but also to make an operating display device, wherein a part of an operating condition display indicating an automobile's operating condition is illuminated, to be freely removable from the rear surface of the rearview mirror. Moreover, the operating condition display is preferably a combination of one or two speed display lamps which are capable of selectively illuminating a specific indicating portion for a predetermined speed range interlocked with the speedometer of the automobile, turn direction display lamps which are capable of being illuminated as a result of being interlocked with a turn signal light, and a brake display lamp capable of being illuminated as a result of being interlocked with a brake light of the automobile.

According to the foregoing construction, the speed display light of the operating condition display is selectively illuminated according to a preset travelling speed range of the automobile, and the operating condition display illuminates the turn direction indicating light by interlocking the same with the turn signal light of the automobile, and similarly illuminates the brake display light by interlocking the same with the brake light of the automobile.

According to the construction mentioned so far, a rearview mirror linked by means of a universal joint with an operating condition display installed in front of a driver's seat permits the adjustment of the angle of the rearview mirror without changing the angle of the operating condition display.

Therefore, the operating condition display is always fixed at its initial position providing its visibility from a position in front of the vehicle due to the maintenance of its originally fixed position.

Consequently, pedestrians in front of the oncoming vehicle, and opposing vehicles, can recognize the driving speed of an automobile as displayed through the windshield, can judge exactly the speed of an automobile coming from the opposite direction, and can therefore take any necessary action if needed. Also the operating condition display comprising a turn direction display lamp and a brake display lamp indicates the operating condition of the vehicle to an oppositely approaching automobile as a warning sign whereby the approaching vehicle is then able to take any necessary action more timely and accurately. Moreover, a rearview mirror connected with an operating condition display by means of a universal joint enables a driver to adjust the angle of a rearview mirror without changing the position of the operating condition display which is fixed so as to always be seen through the windshield.

In addition, in case of the construction of an operating condition display to be hung from a rearview mirror, the operating condition display can be removable separable from the rearview mirror.

BRIEF DESCRIPTION OF THE DRAWINGS

Various other objects, features, and attendant advantages of the present invention will become better appreciated from the following detailed description, when considered in connection with the accompanying drawings, in which like reference characters designate like or corresponding parts throughout the several views, and wherein.

DETAILED DESCRIPTION OF THE ILLUSTRATED EMBODIMENTS

An embodiment of the rearview mirror with an operating condition display according to this invention will be described by referring to the appended drawings.

Figure 1:
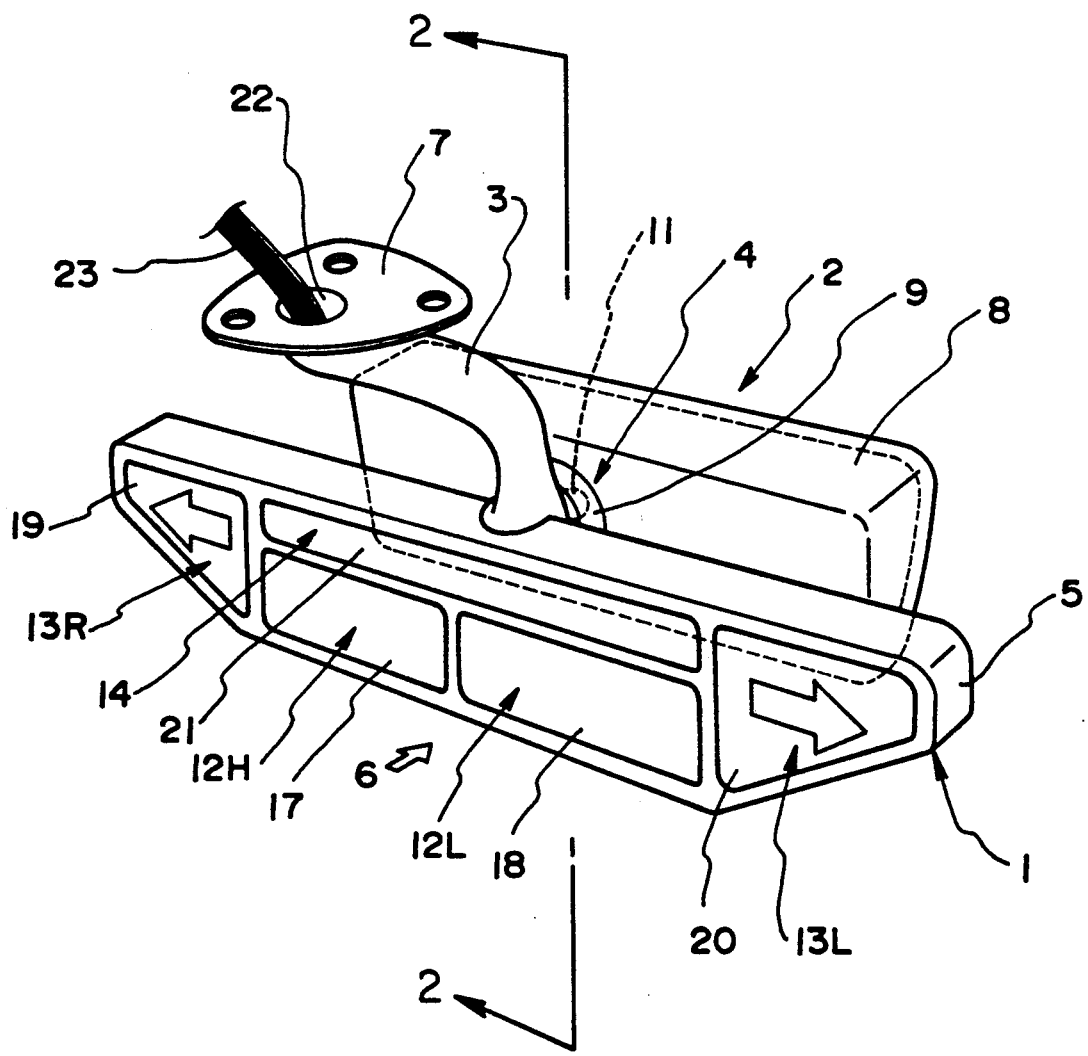
FIG. 1 is a perspective view showing an embodiment of a rearview mirror with an operating condition display according to this invention.
Figure 2:
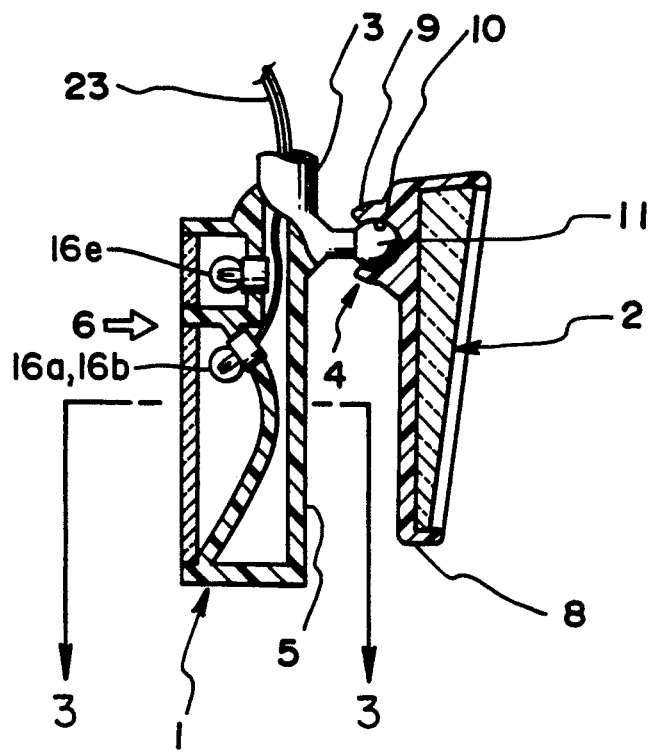
FIG. 2 is a cross section taken along the line 2—2 in FIG. 1.
Figure 3:
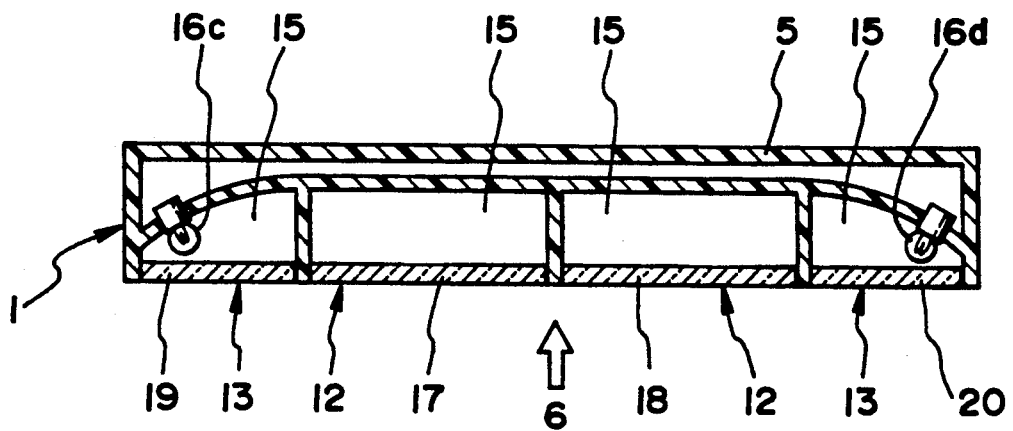
FIG. 3 is a cross section taken along the line 3—3 in FIG. 1.
Figure 4:
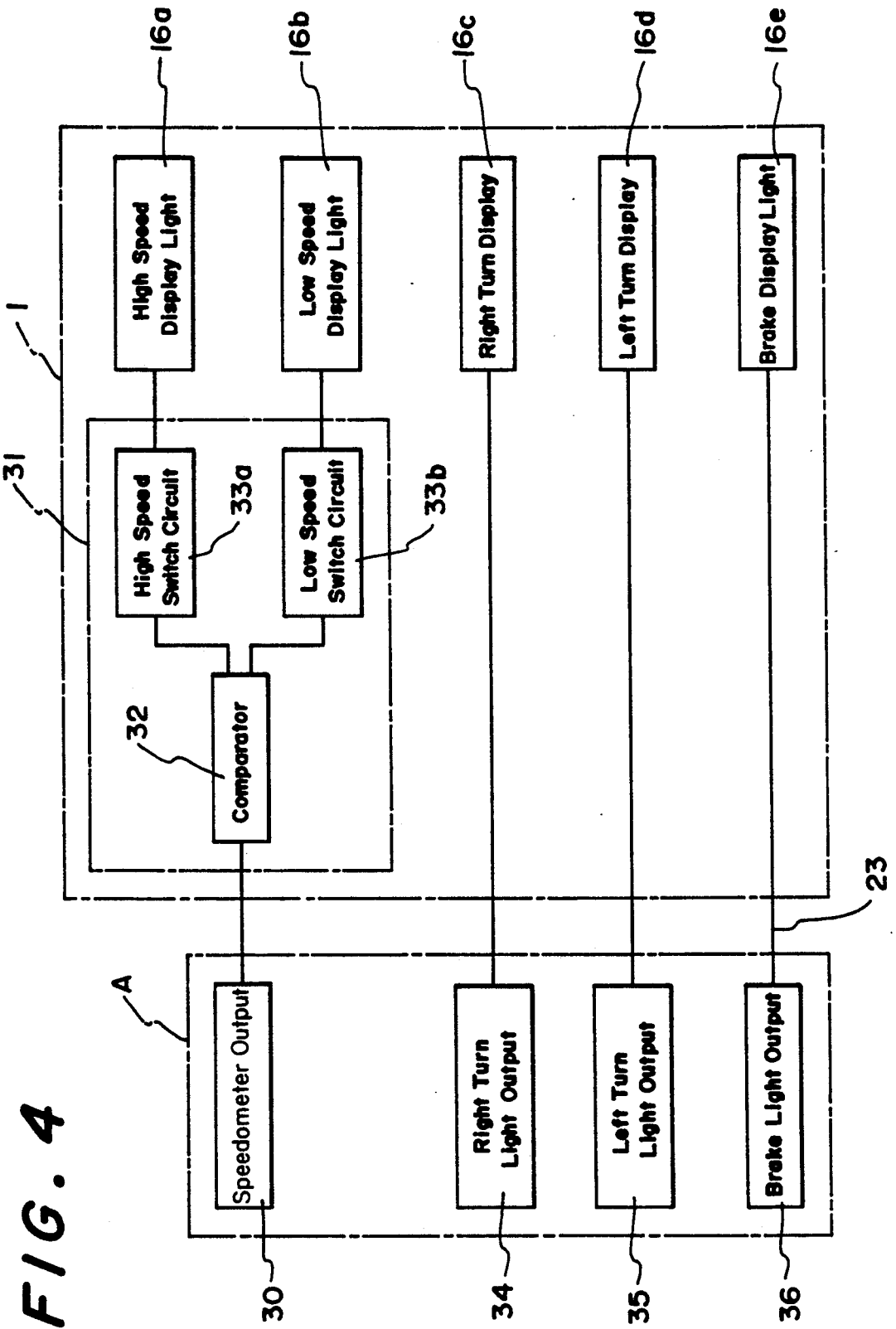
FIG. 4 is a block diagram showing the mechanism of the speed display and the connections of the signal outputs of the automobile.

FIG. 1 and FIG. 2 show the first embodiment. Reference numeral 1 indicates an operating condition display fixed upon the end of a support arm 3, with which a rearview mirror 2 is attached through means of a universal joint system 4 constructed upon the end of the support arm 3.

The operating condition display 1 is installed within a rectangular box molded from a synthetic resin, and the operating condition display components 6 are constructed upon the rear surface (surface seen through the windshield) of the box 5.

The support arm 3 is upwardly from the surface of an upper wall of the box 5, forming a mount portion 7 so as to fix the device to a chassis of a front ceiling portion of the driver's seat of the automobile so that when the support arm 3 is adjusted to the angle of use, the display portion 6 of the operating condition display 1 may be directed toward the front of the automobile.

The rearview mirror 2 is fixed in front of a rectangular box 8, as viewed from the driver's position, which is molded from a synthetic resin, and the ball-type projection 11 separately protruding below the support arm 3 is resiliently accommodated within the ball-type concave portion 10 of a mounting socket 9 integrally formed upon the rear surface of the box 8 so that the angle of the mirror can be selectively adjusted with respect to the display 1.

The operating condition display panel 6 is composed of speed display portions 12H and 12L comprising high speed and low speed display portions, respectively, right and left turn indication display portions 13R and 13L, and a brake display portion 14; and has defined therein light chambers 15, provided by sectioning or dividing the cavity of the box 5 into the noted chambers, and each light chamber 15 is provided with a light bulb 16a, 16b, 16c, 16d, 16e. In addition, its front surface is covered with a filter lens to be described hereinafter.

The combination of the various filter lenses and light bulbs for each of the noted displays is noted, for example, as follows:

| Display | Filter lens | Light bulb |
| --- | --- | --- |
| Speed display portion 12H (high speed) | Yellow filter lens 17 | Light bulb 16a |
| Speed display portion 12L (low speed) | Blue filter lens 18 | Light bulb 16b |
| Turn display portion 13R (right) | Right arrow mark filter lens 19 | Light bulb 16c |
| Turn display portion 13L (left) | Left arrow mark filter lens 20 | Light bulb 16d |
| Brake display portion 14 | Red filter lens 21 | Light bulb 16e |

Furthermore, the light bulbs 16a, 16b, 16c, 16d, 16e of each light chamber 15 are connected to a conductor cable 23 introduced by means of a harness hole 22 defined within the support arm 3, and the light bulbs 16a, 16b of each speed display portion 12H, 12L are connected to a speedometer output 30 and a controller 31 within the automobile A. The light bulb 16b of the low speed display 12L provided with the blue filter lens 18 is illuminated by turning a low speed switch circuit 33b ON when the automobile is within a speed range of 0–50 km/h by means of a speed signal inputted into a comparator 32 of the controller 31, and similarly, when the automobile is being operated within a speed range exceeding 50 km/h, the light bulb 16a of the high speed display 12H provided with the yellow filter lens 17 is illuminated by turning a high speed switch circuit 33a ON.

Furthermore, the light bulbs 16c, 16d provided within the right and left directional turn display portions 13R, 13L are connected in parallel to the turn signal mechanism of the automobile A, and more particularly, the light bulb 16c provided within the right turn display portion 13R provided with a right turn light output 34 and the right arrow mark filter lens 19, and the light bulb 16d associated with the left turn light output 35 and the arrow mark filter lens 20, are connected by means of the conductor cable 23. Moreover, the light bulb 16e provided within the brake display portion 14 is connected in parallel to the brake light of the automobile A, and the light bulb 16e provided with a brake light output 36 and the red filter lens 21 is connected by means of the conductor cable 23.

The rearview mirror with an operating condition display of the foregoing construction enables the pedestrian or the opposing vehicle to observe the operating condition display 6 provided upon the rear surface of the box 5 through the windshield of the automobile in the forward direction of the vehicle, wherein there is displayed the operating condition of the vehicle such as, for example, the speed, turning, and braking of the vehicle to the pedestrian or the opposing vehicle by the selective illumination of the various display components whereby, the pedestrian and/or oncoming vehicle are positively informed thereof by means of the filter colors and the arrow mark displays.

By the way, in the foregoing embodiment, the speed display portions 12H, 12L are indicated as being divided into two ranges, that is, the high speed and the low speed, but, of course, they not only can be displayed by dividing them into additional speed ranges, but also the speed itself can be digitally displayed.

Figure 5:
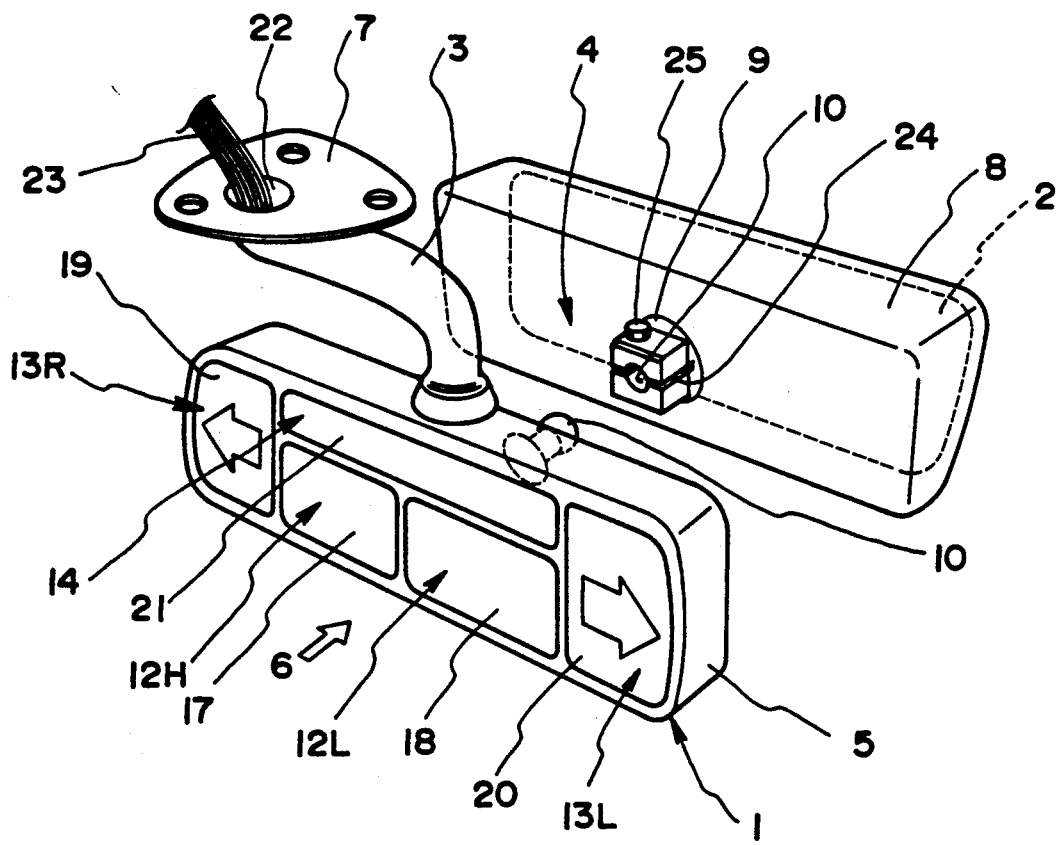
FIG. 5 is a perspective view showing the second embodiment of a rearview mirror with an operating condition display of this invention.
Figure 6:
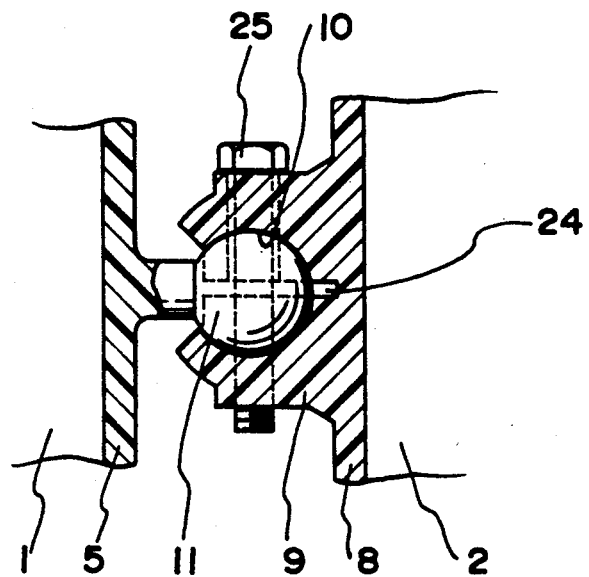
FIG. 6 is a vertical section of the universal joint structure showing the construction condition of a rearview mirror with an operating condition display.

Next, FIG. 5 and FIG. 6 show the second embodiment of this invention, and in case the portions whose constructions are the same as those of the first embodiment, the description will be eliminated but the components will be understood to be properly represented by providing such components with the same reference numerals. In this embodiment, the support arm 3 projects upwardly from the top of the box 5 of the operating display 1, and the rearview mirror 2 is directly connected to the box 5 of the operating display 1 by means of a modified universal joint construction 4.

The universal joint construction 4 is formed in such a manner that the bulb-type convex component 11 provided upon the front side of the box 5 of the operating display 1 is inserted into the bulb-type concave component 10 of the support mount 9 formed upon the rear surface side of the box 8 of the rearview mirror, mount 9 also defining a horizontal groove intersecting the bulb-type concave opening or component 10, whereby the groove 24 can be constricted, and similarly for the concave portion 10, by mean of a bolt 25 which is disposed within a threaded bore oriented within a plane perpendicular to that of the groove 24 such that the convex component 11 is retained within concave socket 10.

Therefore, while setting the angle of the rearview mirror 2, the universal joint construction 4 fixed by means of the bolt 25 maintains the rearview mirror in the selected position.

In addition, it is to be noted that while the universal joint construction 4 described in the foregoing embodiment is one wherein the bulb-type concave portion 10 is defined upon the rearview mirror 2 and the bulb-type convex portion 11 is defined upon the operating condition display 1 or the support arm 3 side, it is to be understood that the same embodiment can be obtained even if the constructions are reversed.

Figure 7:
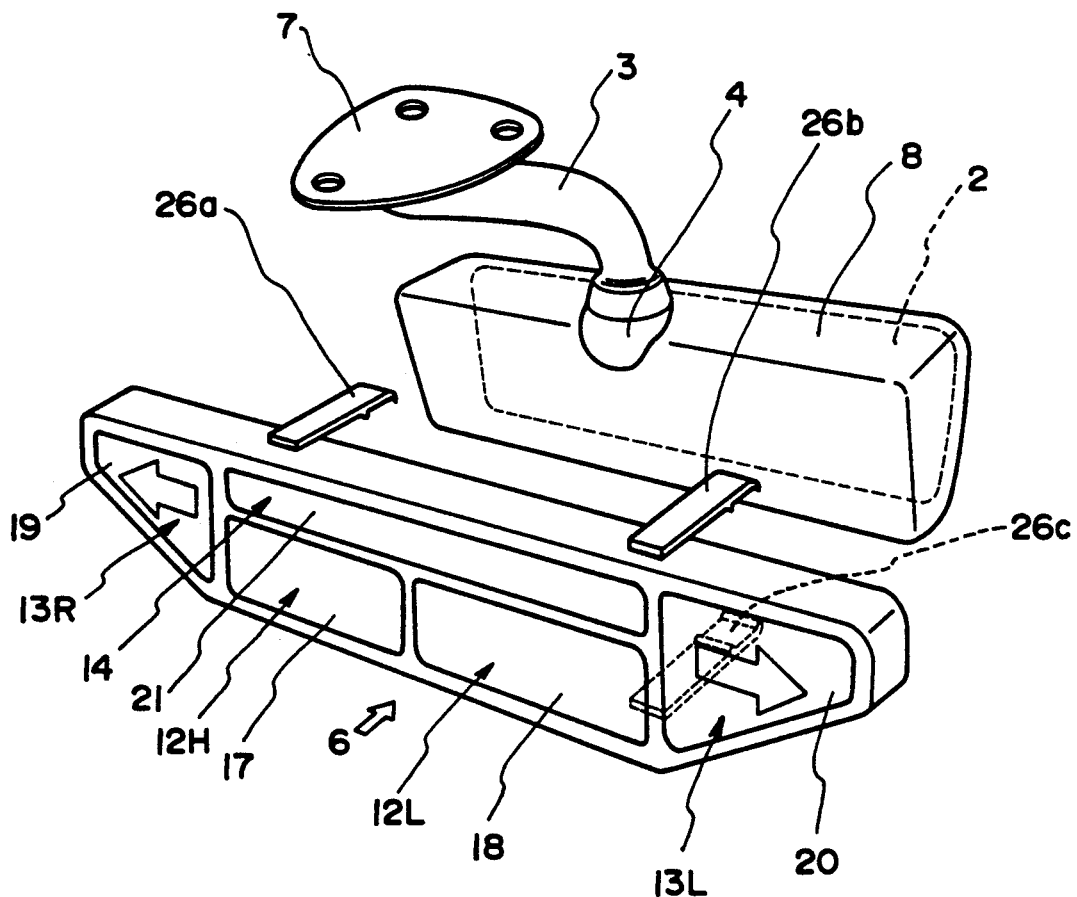
FIG. 7 is an exploded perspective view showing the third embodiment of this invention.
Figure 8:
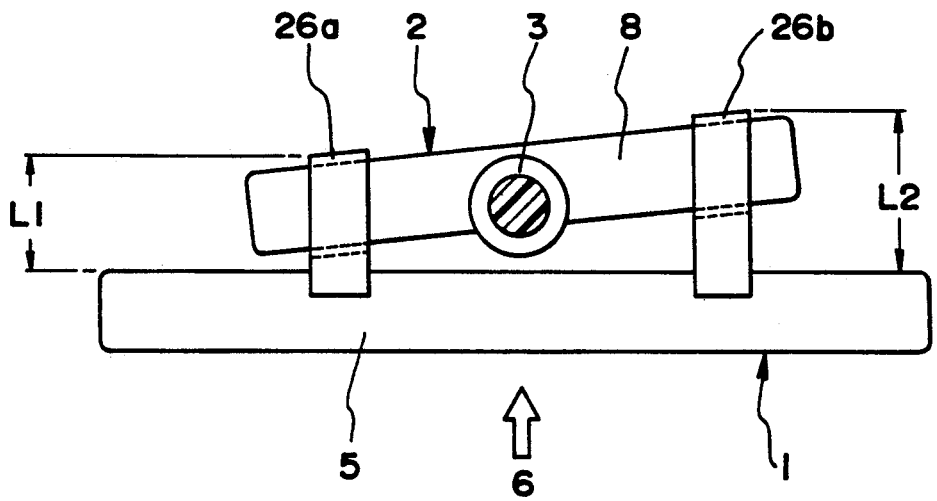
FIG. 8 is a plain view showing the hanging condition of a rearview mirror with an operating condition display.

Furthermore, FIG. 7 and FIG. 8 describe the third embodiment of this invention in which the operating display 1 is constructed in such a manner that it is readily removable or separable from the box 8 of the rearview mirror 2.

In this embodiment, the box 8 of the rearview mirror 2, as in the case of the conventional rearview mirror, is fixed upon the ceiling of the automobile by means of the support arm 3 which projects upwardly from the box 8 by means of a universal joint construction 4.

From the box 5 upon the operating display side, anchoring projections 26a, 26b... project outwardly from the box 5 from positions defined above and below the rear surface side, respectively and are so designed that the anchoring ends may be resiliently integrated with the upper and lower edges of the box 8 of the rearview mirror whereby the display 1 is removable from mirror box 8. The anchoring projections 26a, 26b... are different in horizontal lengths L1, L2... with respect to each other so that when the rearview mirror 2 is adjusted to the angle of use, the display portion of the operating condition display 6 of the operating display 1 integrated with the box 5 may nevertheless be directed substantially toward the front of the automobile, as a result of which, that is, its proper orientation, the pedestrians and oncoming vehicles can observe the same.

As described in the foregoing, the operating display 1, which is removable from the rear surface side of the box 8 of the rearview mirror 2 can therefor be removed when not in use.

It is, of course, to be understood that the present invention is, by no means, limited to the specific showing in the drawings but also comprise any modifications within the scope of the appended claims.

I claim:

1. In combination, a rearview mirror and operating condition display system for a vehicle, comprising:

support means non-movably fixed within said vehicle;

an operating condition display non-movably fixed directly upon said support means disposed within said vehicle so as to render said operating condition display visible through a front windshield of said vehicle;

first pivotable support means fixedly mounted upon a rear surface portion of said operating condition display;

a rearview mirror having a mirror component thereof disposed rearwardly so as to provide a driver of said vehicle with a view of the environment disposed behind said vehicle; and second pivotable support means fixedly mounted upon a front surface portion of said rearview mirror for pivotable mating engagement with said first pivotable support means of said operating condition display so as to render said rearview mirror pivotably adjustable with respect to and independent of said operating condition display in a plurality of directions while said operating condition display remains non-movably fixed within said vehicle so as to constantly display the operating conditions of said vehicle through said front windshield of said vehicle.

2. The combination as set forth in claim 1, wherein:

said operating condition display comprises vehicle speed indicating means operatively connected to speedometer means disposed upon said vehicle.

3. The combination as set forth in claim 2, wherein:

said vehicle speed indicating means comprises a plurality of speed indicating display elements which are separately and individually operative within predetermined speed ranges of said vehicle.

4. The combination as set forth in claim 3, wherein:

said plurality of speed indicating display elements comprises two speed indicating display elements predeterminedly operative within relatively high and relatively low speed ranges of said vehicle.

5. The combination as set forth in claim 4, wherein:

said relatively low speed range of said vehicle comprises a vehicle speed within the range of 0–50 km/hr; and said relatively high speed range of said vehicle comprises a vehicle speed which exceeds 50 km/hr.

6. The combination as set forth in claim 4, wherein:

said two speed indicating display elements comprise two different illumination means.

7. The combination as set forth in claim 6, wherein said two different illumination means comprise:

means defining two separate compartments within said operating condition display;

an illumination lamp disposed within each one of said two compartments;

first colored filter means disposed within a first one of said two compartments such that upon illumination of said illumination lamp within said first one of said two compartments as a result of said vehicle being operated at a first predetermined speed, a first colored illumination indicia will be displayed; and second colored filter means disposed within a second one of said two compartments such that upon illumination of said illumination lamp within said second one of said two compartments as a result of said vehicle being operated at a second predetermined speed, a second colored illumination indicia, different from said first colored illumination indicia as a result of said second colored filter means being different from said first colored filter means, will be displayed.

8. The combination as set forth in claim 7, wherein:
said first colored illumination indicia comprises a yellow display corresponding to said relatively high operating speed range of said vehicle; and
said second colored illumination indicia comprises a blue display corresponding to said relatively low operating speed range of said vehicle.

9. The combination as set forth in claim 1, wherein:
said operating condition display comprises vehicle braking indicating means operatively connected to braking means disposed upon said vehicle.

10. The combination as set forth in claim 9, wherein:
said vehicle braking indicating means comprises red colored filter and illumination means for displaying a red illumination signal when said vehicle is being operated in a braking mode.

11. The combination as set forth in claim 1, wherein:
said operating condition display comprises left and right turn indicating means operatively connected to left and right turn switching means disposed upon said vehicle.

12. The combination as set forth in claim 11, wherein:
said left and right turn indicating means comprises left and right arrow indicia filter means, and illumination means therefor, for displaying a left and right turn signal, respectively, when said vehicle is being operated in a left and right turn mode, respectively.

13. The combination as set forth in claim 1, wherein:
said support means non-movably fixed within said vehicle comprises a hollow tubular support arm for fixedly supporting said operating condition display within said vehicle; and
electrical cable means disposed within said hollow tubular support arm and connected to said operating condition display for providing electrical power to said operating condition display.

14. The combination as set forth in claim 1, wherein said second pivotable support means comprises:
horizontally disposed slot means defined within said second pivotable support means and extending from a front surface portion of said second pivotable support means toward said front surface portion of said rearview mirror so as to partially divide said second pivotable support means into an upper half portion and a lower half portion wherein said upper and lower half portions can be constricted together so as to fixedly engage said first pivotable support means of said operating condition display so as to fixedly retain said rearview mirror in a selectively adjusted position relative to said operating condition display; and
bolt means passing through said upper and lower half portions of said second pivotable support means for constricting said upper and lower half portions together in order to fixedly retain said rearview mirror in said selectively adjusted position relative to said operating condition display.

15. In combination, a rearview mirror and operating condition display system for a vehicle, comprising:
first support means fixedly mounted within said vehicle;
a rearview mirror, having a mirror component thereof disposed rearwardly so as to provide a driver of said vehicle with a view of the environment disposed behind said vehicle, pivotably mounted upon said first support means;
an operating condition display mounted in front of said rearview mirror so as to render said operation condition display visible through a front windshield of said vehicle; and
second support means interconnecting and supporting said operating condition display directly to and upon said rearview mirror such that said rearview mirror is pivotably adjustable to a predetermined angle with respect to said front windshield and with respect to said operating condition display is disposed parallel to said front windshield in order to display the operating conditions of said vehicle through said front windshield of said vehicle;
said second support means comprising two pairs of laterally spaced, resiliently flexible support arms fixedly attached at one end of each of said arms to said operating condition display, upon upper and lower surfaces of said operating condition display, for releasably engaging upper and lower surfaces of said rearview mirror so as to removably mount said operating condition display upon said rearview mirror.

16. The combination as set forth in claim 15, wherein:
said operating condition display comprises vehicle speed indicating means operatively connected to speedometer means disposed upon said vehicle.

17. The combination as set forth in claim 16, wherein:
said vehicle speed indicating means, comprises a plurality of speed indicating display elements which are separately and indivdually operative within predetermined speed ranges of said vehicle.

18. The combination as set forth in claim 17, wherein:
said plurality of speed indicating display elements comprises two speed indicating display elements predeterminedly operative within relatively high and relatively low speed ranges of said vehicle.

19. The combination as set forth in claim 18, wherein:
said relatively low speed range of said vehicle comprises a vehicle speed within the range of 0-50 km/hr; and
said relatively high speed range of said vehicle comprises a vehicle speed which exceeds 50 km/hr.

20. The combination as set forth in claim 18, wherein:
said two speed indicating display elements comprise two different illumination means.

21. The combination as set forth in claim 20, wherein said two different illumination means comprise:
means defining two separate compartments within said operating condition display;
an illumination lamp disposed within each one of said two compartments;
first colored filter means disposed within a first one of said two compartments such that upon illumination of said illumination lamp within said first one of said two compartments as a result of said vehicle being operated at a first predetermined speed a first colored illumination indicia will be displayed; and second colored filter means, different from said first colored filter means, disposed within a second one of said two compartments such that upon illumination of said illumination lamp within said second one of said two compartments as a result of said vehicle being operated at a second predetermined speed, a second colored illumination indicia will be displayed.

22. The combination as set forth in claim 21, wherein:

said first colored illumination indicia comprises a yellow display corresponding to said relatively high operating speed range of said vehicle; and said second colored illumination indicia comprises a blue display corresponding to said relatively low operating speed range of said vehicle.

23. The combination as set forth in claim 15, wherein:

said operating condition display comprises vehicle braking indicating means operatively connected to braking means disposed upon said vehicle.

24. The combination as set forth in claim 23, wherein:

said vehicle braking indicating means comprises red colored filter and illumination means for displaying a red illumination signal when said vehicle is being operated in a braking mode.

25. The combination as set forth in claim 15, wherein: said operating condition display comprises left and right turn indicating means operatively connected to left and right turn switching means disposed upon said vehicle.

26. The combination as set forth in claim 25, wherein:

said left and right turn indicating means comprises left and right arrow indicia filter means, and illumination means therefor, for displaying a left and right turn signal, respectively, when said vehicle is being operated in a left and right turn mode, respectively.

27. The combination as set forth in claim 15, wherein:

said first support means comprises a hollow tubular support arm; and electrical cable means disposed within said hollow tubular support arm and connected to said operating condition display for providing electrical power to said operating condition display.

28. The combination as set forth in claim 15, wherein:

a first pair of said two laterally spaced pairs of arms has a length which is greater than the length of a second pair of said two laterally spaced pairs of arms so as to permit said rearview mirror to be disposed at said predetermined angle while said operating condition display is disposed parallel to said front windshield of said vehicle.

* * * * *